US012339075B2

(12) United States Patent
Yu et al.

(10) Patent No.: US 12,339,075 B2
(45) Date of Patent: Jun. 24, 2025

(54) BI-FUNCTIONAL THERMAL COOLING SYSTEMS AND METHODS THEREOF

(71) Applicant: Toyota Motor Engineering & Manufacturing North America, Inc., Plano, TX (US)

(72) Inventors: Ziqi Yu, Ann Arbor, MI (US); Xiaopeng Li, Ann Arbor, MI (US); Taehwa Lee, Ann Arbor, MI (US); Hideo Iizuka, Nagakute (JP)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 413 days.

(21) Appl. No.: 17/961,285

(22) Filed: Oct. 6, 2022

(65) Prior Publication Data

US 2023/0280109 A1 Sep. 7, 2023

Related U.S. Application Data

(60) Provisional application No. 63/330,085, filed on Apr. 12, 2022, provisional application No. 63/315,180, filed on Mar. 1, 2022.

(51) Int. Cl.
*F28F 13/00* (2006.01)
*B82Y 20/00* (2011.01)
(Continued)

(52) U.S. Cl.
CPC ............... *F28F 5/00* (2013.01); *B82Y 20/00* (2013.01); *B82Y 30/00* (2013.01); *F25B 23/003* (2013.01);
(Continued)

(58) Field of Classification Search
CPC ...... F28F 13/00; F28F 13/18; F28F 2013/001; F28F 2013/005; F28F 2013/008;
(Continued)

(56) References Cited

U.S. PATENT DOCUMENTS 5,838,065 A 11/1998 Hamburgen et al.
7,219,713 B2 5/2007 Gelorme et al.
(Continued)

FOREIGN PATENT DOCUMENTS

CN 109405625 A * 3/2019
CN 111609750 A * 9/2020
(Continued)

OTHER PUBLICATIONS

Yang et al., "Twist-induced control of near-field heat radiation between magnetic Weyl semimetals", ACS Photonics 8.2 (2021): 443-448.
(Continued)

*Primary Examiner* — Jianying C Atkisson
*Assistant Examiner* — For K Ling
(74) *Attorney, Agent, or Firm* — Dinsmore & Shohl LLP

(57) ABSTRACT

Embodiments described herein relate to a bi-functional thermal cooling system. The bi-functional thermal cooling system includes a first body, a second body, and a third body. The second body has a first plurality of Weyl semimetal nanostructures. The second body is spaced apart from the first body. The third body has a second plurality of Weyl semimetal nanostructures. The third body is spaced apart from the second body. The second body and the third body are each configured to independently rotate with respect to the first body to change an optical property of the first plurality of Weyl semimetal nanostructures of the second body and an optical property of the second plurality of Weyl semimetal nanostructures of the third body.

20 Claims, 5 Drawing Sheets

(51) Int. Cl.
*B82Y 30/00* (2011.01)
*F25B 23/00* (2006.01)
*F28F 5/00* (2006.01)
*F28F 27/00* (2006.01)
*G02B 1/00* (2006.01)

(52) U.S. Cl.
CPC ............. *F28F 13/00* (2013.01); *F28F 27/00* (2013.01); *G02B 1/002* (2013.01); *F28F 2013/001* (2013.01); *F28F 2013/008* (2013.01); *F28F 2255/20* (2013.01)

(58) Field of Classification Search
CPC ...... F28F 2245/06; B82Y 20/00; B82Y 30/00; G02B 1/002
See application file for complete search history.

(56) References Cited

U.S. PATENT DOCUMENTS

| | | | |
|---|---|---|---|
| 9,080,820 B2 | 7/2015 | Bolton | |
| 9,640,748 B2* | 5/2017 | Gotsmann | ............... H10N 30/30 |
| 10,256,391 B2 | 4/2019 | Gooth et al. | |
| 11,011,692 B2 | 5/2021 | Heremans et al. | |
| 11,204,206 B2 | 12/2021 | Busche | |
| 2004/0098991 A1 | 5/2004 | Heyes | |
| 2015/0338175 A1* | 11/2015 | Raman | ..................... B60H 1/32 |
| | | | 165/185 |
| 2020/0348055 A1 | 11/2020 | Pereira et al. | |
| 2021/0285735 A1* | 9/2021 | Dede | ........................ F28F 23/00 |

FOREIGN PATENT DOCUMENTS

| | | |
|---|---|---|
| WO | 2014032684 A1 | 3/2014 |
| WO | 2014148585 A1 | 9/2014 |

OTHER PUBLICATIONS

Kan et al., "Near-field radiative heat transfer in three-body systems with periodic structures", Physical Review B 99.3 (2019): 035433.

He, et al., "Active control of near-field radiative heat transfer by a graphene-gratings coating-twisting method", Optics etters 45.10 (2020): 2914-2917.

Kan et al., "Near field radiative heat transfer in asymmetric three-grating systems", International Journal of Heat and Mass Transfer 171 (2021): 121124.

Yang et al., "Twist-induced control of near-field thermal radiation in multilayered black phosphorus/vacuum system" International Journal of Thermal Sciences 170 (2021): 107142.

Iizuka et al., "Control of non-equilibrium Casimir force." Applied Physics Letters 118.14 (2021): 144001.

Iizuka et al., "Significant Enhancement of Near-Field Electromagnetic Heat Transfer in a Multilayer Structure through Multiple Surface-States Coupling", Physical review letters 120.6 (2018): 063901.

* cited by examiner

BI-FUNCTIONAL THERMAL COOLING SYSTEMS AND METHODS THEREOF

CROSS-REFERENCE TO RELATED APPLICATIONS

This utility patent application claims priority from U.S. Provisional Patent Application Ser. No. 63/315,180 filed Mar. 1, 2022, and entitled "Near-Field Radiative Heat Transfer in Multilayer Weyl Semimetals" and U.S. Provisional Patent Application Ser. No. 63/330,085 filed Apr. 12, 2022, and entitled "Near-Field Radiative Heat Transfer in Three-Body Weyl Semimetals", the contents of each are included herein by reference.

TECHNICAL FIELD

The present specification generally relates to radiative cooling, and more particularly, to near-field radiative heat transfer.

BACKGROUND

Passive radiative cooling is known for improving energy efficiencies by providing a path to dissipate heat from a structure into an atmosphere. Further, it is known to use radiative cooling via pigmented paints, dielectric coating layers, metallized polymer films, and organic gases because of their intrinsic thermal emission properties. Additionally, known thermal switch devices may be designed by placing two parallel Weyl semimetal planar objects distancing a nanoscale gap and rotating one object with respect to the other. As the rotation angle increases, the amount of heat transfer will decrease. However, such designs only allow for heat transfer reduction,

SUMMARY

In one embodiment, a bifunctional thermal cooling system is provided. The bi-functional thermal cooling system includes a first body, a second body, and a third body. The second body has a first plurality of Weyl semimetal nanostruaures. The second body is spaced apart from the first body. The third body has a second plurality of Weyl semimetal nanostructures. The third body is spaced apart from the second body. The second body and the third body are each configured to independently rotate with respect to the first body to change an optical property of the first plurality of Weyl semimetal nanostructures of the second body and an optical property of the second plurality of Weyl semimetal nanostructures of the third body.

In another embodiment, a method for forming a bi-functional thermal cooling system is provided. The method includes rotating a second body having a first plurality of Weyl semimetal nanostructures, the second body is spaced apart from a first body, wherein the rotation of the second body changes an optical property of the first plurality of Weyl semimetal nanostructures and independently rotating a third body having a second plurality of Weyl semimetal nanostructures, the third body is positioned spaced apart from the first body and the second body, wherein the rotation of the third body changes an optical property of the second plurality of Weyl semimetal nanostructures.

In yet another embodiment, a thermal cooling system is provided. The thermal cooling system includes a first body, a second body, and a third body. The first body configured as a heat source that generates a heat. The second body has a first plurality of Weyl semimetal nanostructures and is spaced apart from the first body. The second body is a heat modulator. The third body has a second plurality of Weyl semimetal nanostructures. The third body is spaced apart from the second body. The second body is positioned between the first body and the third body. The third body is a heat sink to receive the heat. The second body and the third body are each configured to independently rotate with respect to the first body to change an optical property of the first plurality of Weyl semimetal nanostructures of the second body and an optical property of the second plurality of Weyl semimetal nanostructures of the third body.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments of the present disclosure are directed to hi-functional thermal cooling systems that include a first body having a first plurality of Weyl semimetal nanostructures, a second body having a second plurality of Weyl semimetal nanostructures, and a third body having a third plurality of Weyl semimetal nanostructures that form a three-body system. The second body is spaced apart from the first body and the third body is spaced apart from the second body. As such, the second body is positioned between the first and third bodies such that the first body, the second body and the third body are arranged in a linear arrangement along a same plane. The second body and the third body are each configured to independently rotate with respect to the first body to change an optical property of the second plurality of Weyl semimetal nanostructures of the second body and an optical property of the third plurality of Weyl semimetal nanostructures of the third body.

The rotation of the second body or the third body changes an optical property of the second plurality of Weyl semimetal nanostructures of the second body and the third plurality of Weyl semimetal nanostructures of the third body to create a mismatch in a permittivity of the optical properties of the second body and the third body compared to the optical properties of the first body. The rotation of the second body and/or the third body increases or decreases a near-field radiative heat transfer compared to a static state of the second body or the third body.

As such, the heat transfer is modulated by simultaneously rotating of each body, in which the effect of the nonreciprocal surface plasmon polaritons is combined with the three-body effect. Due to the significantly enhanced heat transfer in the three-body system, compared to a conventional Weyl semimetal two-body system, the amount of heat transfer is substantially increased without a thermal switch ratio surpassing that of the conventional two-body system. By further allowing asymmetric positioning of the object, the thermal switch ratio exceeds that of the conventional Weyl semimetal two-body system. That is, the rotation of the second body and/or the third body changes the position of a second body such that the first body, the second body, and the third body switch between a symmetric arrangement and an asymmetric arrangement.

Various embodiments of optical metamaterials system to tune radiative cooling are described in detail herein.

As used herein, the term "communicatively coupled" means that coupled components are capable of exchanging data signals and/or electric signals with one another such as, for example, electrical signals via conductive medium, electromagnetic signals via air, optical signals via optical waveguides electrical energy via conductive medium or a non-conductive medium, data signals wirelessly and/or via conductive medium or a non-conductive medium and the like.

Figure 1:
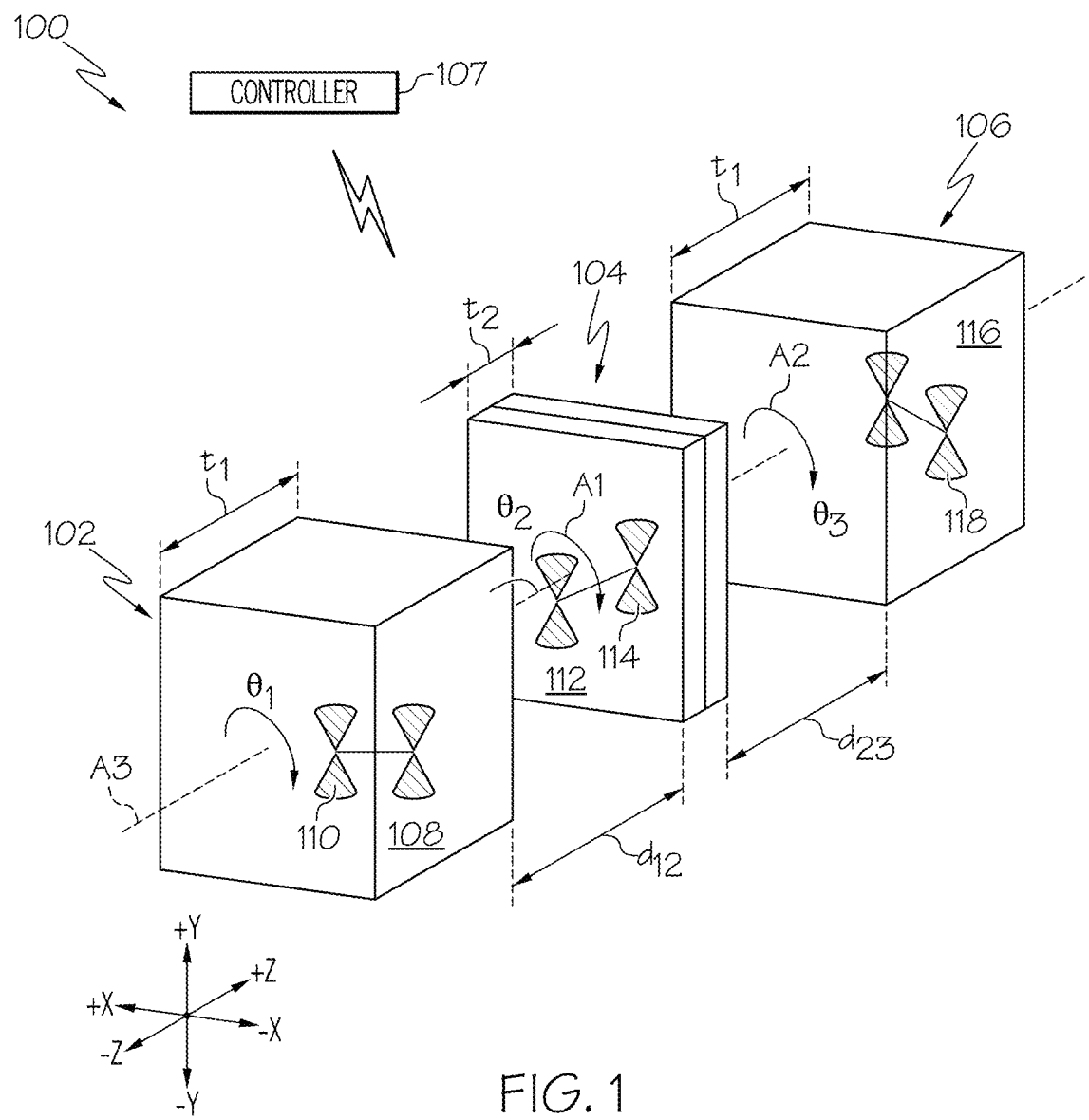
FIG. 1 schematically depicts a perspective view of a first example bi-functional thermal cooling system according to one or more embodiments shown and described herein.

Further, as used herein, the term "system lateral direction" refers to the forward-rearward direction of the system (i.e., in a +/−Y direction of the coordinate axes depicted in FIG. 1), The term "system longitudinal direction" refers to the cross-direction (i.e., along the X-axis of the coordinate axes depicted in FIG. 1), and is transverse to the lateral direction. The term "system vertical direction" refers to the upward-downward direction of the system (i.e., in the +/−Z direction of the coordinate axes depicted in FIG. 1).

Figure 2:
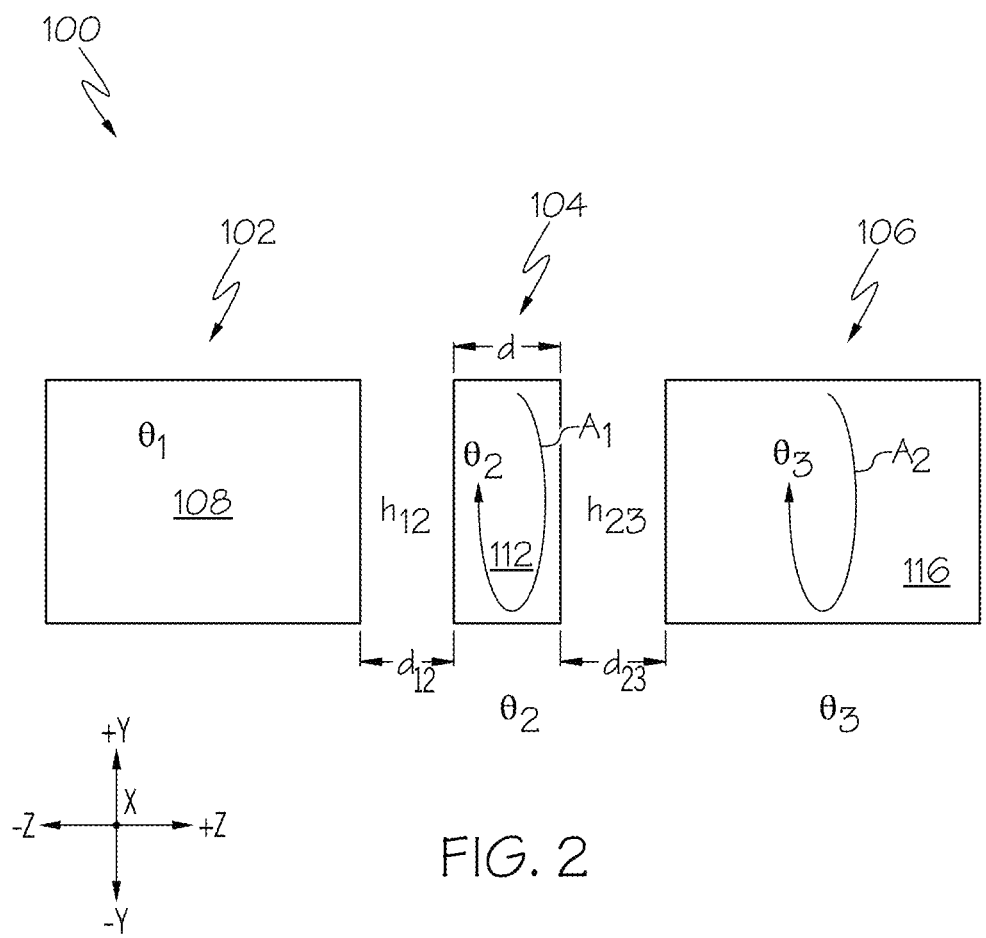
FIG. 2 schematically depicts side view of the bi-functional thermal cooling system of FIG. 1 according to one or more embodiments shown and described herein.

Referring now to FIGS. 1-2, an example bi-functional thermal cooling system 100 is schematically illustrated. The example hi-functional thermal cooling system 100 may be a three body cooling system that includes a first body 102, a second body 104, or object, spaced apart from the first body 102, and a third body 106, spaced apart from the second body 104. The second body 104 may be positioned between the first body 102 and the third body 106. As such, the first body 102, the second body 104 and the third body 106 may be positioned in a linear arrangement along a same axis.

The first body 102 has an outer surface 108 that includes a first plurality of Weyl semimetal nanostructures 110. As used herein, "Weyl semimetal nanostructures" may be three-dimensional topological materials where valence band and conduction band touch at finite specific points in momentum space. The first plurality of Weyl semimetal nanostructures 110 may be any shape including, for example, bicone shaped, dicone shaped, cone shaped, frustoconical shaped, cylindrical shaped, tetragonal shaped, hexagonal shaped, and/or the like.

The second body 104 has an outer surface 112 that includes a second plurality of Weyl semimetal nanostructures 114, The second plurality of Weyl semimetal nanostructures 114 may be any shape including, for example, bicone shaped, dicone shaped, cone shaped, frustoconical shaped, cylindrical shaped, tetragonal shaped, hexagonal shaped, and/or the like. The second plurality of Weyl semimetal nanostructures 114 may be the same or different from those of the first plurality of Weyl semimetal nanostructures 110.

The third body 106 has an outer surface 116 that includes a third plurality of Weyl semimetal nanostructures 118. The third plurality of Weyl semimetal nanostructures 118 may be any shape including, for example, bicone shaped, dicone shaped, cone shaped, frustoconical shaped, cylindrical shaped, tetragonal shaped, hexagonal shaped, and/or the like. The third plurality of Weyl semimetal nanostructures 118 may be the same as or different from those of the first plurality of Weyl semimetal nanostructures 110 and/or the second plurality of Weyl semimetal nanostructures 114.

In some embodiments, the first body 102 may be a heat source to generate a heat, the second body 104 may be a heat modulator to receive/modulate the heat, and the third body 106 may be a heat sink. Further, in some embodiments, a controller 107, such as a microprocessor may be communicatively coupled to the first body 102, the second body 104, and/or the third body 106. It should be appreciated that more than one microprocessor may be communicatively coupled to the first body 102, the second body 104, and/or the third body 106 (e.g., one microprocessor for each body or one microprocessor that is shared between the second body 104 and the third body 106, and the like). The microprocessor of the controller 107 may be a computer processor where the data processing logic and control is included on a single integrated circuit, or a small number of integrated circuits and contains the arithmetic, logic, and control circuitry required to perform the functions of a computer's central processing unit.

Still referring to FIGS. 1-2, in some embodiments, the first body 102, the second body 104, and the third body 106 are oriented along the same axis, for example, the z-axis. Further, the spaces or gaps between each of the first body 102, second body 104, and third body 106 may be a cavity, or a vacuum gap $d_{12}$ and $d_{23}$. That is, the cavity or vacuum gap 42 may be positioned to separate the first body 102 from the second body 104. The cavity or vacuum gap $d_{23}$ may be positioned to separate the second body 104 from the third body 106.

In some embodiments, the thickness of the first body 102 and the third body 106 are equal, as illustrated by $t_1$. The second body 104 has a thickness less than that of the first body 102 and the second body 104, as illustrated by $t_2$. In other embodiments, the thickness $t_1$ of the first body 102 and the third body 106 may be different where either the thickness $t_1$ of the first body 102 is greater than the thickness $t_1$ of the third body 106 or the thickness $t_1$ of the third body 106 is greater than the thickness $t_1$ of the first body 102.

Further, in some embodiments, the space between the first body 102 and the second body 104 defined by the vacuum gap $d_{12}$ may be equal to the space between the second body 104 and the third body 106 defined by the vacuum gap $d_{23}$. In other embodiments, the space between the first body 102 and the second body 104 defined by the vacuum gap die may be different than the space between the second body 104 and the third body 106 defined by the vacuum gap $d_{23}$, Further, in some embodiments, the space between the first body 102 and the second body 104 defined by the vacuum gap $d_{12}$ and the space between the second body 104 and the third body 106 defined by the vacuum gap ($d_{23}$ may be the same or equal to the thickness $t_2$ of the second body 104, as illustrated by d in FIG. 2 where d=$d_{12}$=$d_{23}$.

In a non-limiting example; when the thickness $t_2$ of the second body is 100/3 nanometers (nm y each of the vacuum gap die and the vacuum gap $d_{23}$ may each also be 100/3 nm. As such, in this example, the total distance between the first body 102 and the third body 106 is 100 nm (e.g., $t_2$± vacuum gap $d_{12}$+ vacuum gap $d_{23}$). It should be appreciated and understood that the thickness $t_2$, the vacuum gap $d_{12}$, and/or the vacuum gap $d_{23}$ may be larger or smaller than 100/3 nm. For example, the vacuum gap $d_{12}$ and the vacuum gap $d_{23}$ may each be equal to 100 nm and $t_2$ is equal to 100~400 nm.

Still referring to FIGS. 1-2, in some embodiments, the thickness $t_2$ of the second body 104 may be a finite plate made of Weyl semimetals. In some embodiments, the first body 102 and the third body 106 may each be semi-infinite plates with the first body 102 at temperature of T−$\Delta T_1$ and the third body 106 at temperature T+$\Delta T_2$, separated by the vacuum gaps $d_{12}$ and $d_{23}$ from the second body 104, which is at the temperature of T and has a thickness of $t_2$. The near-field thermal radiation between two Weyl semimetal plates may be modulated by applying a relative rotation, as discussed in greater detail herein. As such, as discussed in greater detail herein, the first body 102 is fixed and the second body 104 and the third body 106 may freely and independently rotate away from the x-axis by angles of $\theta_2$ and $\theta_3$ ranging from 0 to π as depicted by arrows A1 and A2 in FIG. 1, The controller 107 may be programmed to cause the second body 104 and the third body 106 may freely and independently rotate away from the x-axis by angles of $\theta_2$ and $\theta_3$ ranging from 0 to π.

That is, the second body 104 and the third body 106 are each configured to independently rotate along an axis A3, depicted in FIG. 1 with the first body 102 remaining stationary. As such, the second body 104 and the third body 106 rotate with respect to the first body 102. As discussed in greater detail herein, the rotation of either the second body 104 and/or the third body 106 changes an optical property of the second plurality of Weyl semimetal nanostructures 114 of the second body 104 and an optical property of the third plurality of Weyl semimetal nanostructures 118 of the third body 106. The changes in the optical properties of the second body 104 and the third body 106 may create a mismatch in a permittivity of the optical properties of the second body 104 and the third body 106 compared to the optical properties of the first body 102, as discussed in greater detail herein. Further, the rotation of the second body 104 or the third body 106 increases or decreases a near-field radiative heat transfer compared to a static state of the second body 104 or the third body 106, as discussed in greater detail herein. That is, changing the position of the second body 104 such that the first body 102, the second body 104, and the third body 106 switch between a symmetric arrangement and an asymmetric arrangement to increase or decrease the near-field radiative heat transfer, as discussed in greater detail herein.

In other embodiments, the first body 102, the second body 104, and/or the third body 106, while illustrated as plates and square, is non-limiting and the first body 102, the second body 104, and/or the third body 106 may be any shape, such as an octagon, rectangular, hexagonal, spherical, elliptical, and the like.

Still referring to FIGS. 1-2, the near-field thermal radiation between the first body 102 and the second body 104 may be modulated by applying a relative rotation. Incident electromagnetic waves may be parallel to the xz-plane with incident angles ϕ from the x-axis. As such, when the second body 104 and the third body 106 each host Weyl nodes with a wavevector separation of $\vec{2}$, where $\vec{b}$=bŷ, the permittivity tensor is defined by Equation 1 below:

$$\bar{\epsilon}(\phi + \theta_m) = \begin{bmatrix} \epsilon_d & 0 & -i\epsilon_a\cos(\phi + \theta_m) \\ 0 & \epsilon_d & i\epsilon_a\sin(\phi + \theta_m) \\ -i\epsilon_a\cos(\phi + \theta_m) & -i\epsilon_a\sin(\phi + \theta_m) & \epsilon_d \end{bmatrix} \quad (1)$$

where m=2, 3 correspond to the second body 104 or the third body 106, and $$\epsilon_a = \frac{be^2}{2\pi^2 \hbar \omega}.$$

Therefore, $\bar{\epsilon}$ is asymmetric and breaks Lorentz reciprocity. The diagonal component $\epsilon_d$ is calculated by using the Kubo-Greenwood formalism within the random phase approximation to a two-band model with spin degeneracy, defined by Equation 2 below:

$$\epsilon_d = \epsilon_b + \frac{ir_s g}{6\Omega_0}\Omega G\left(\frac{\Omega}{2}\right) - \frac{r_s g}{6\pi\Omega_0}\left\{\frac{4}{\Omega}\left[1 + \frac{\pi^2}{3}\left(\frac{k_B T}{E_F(T)}\right)^2\right] + 8\Omega \int_0^{\eta_c} \frac{G(\eta) - G\left(\frac{\Omega}{2}\right)}{\Omega^2 - 4\eta^2}\eta d\eta\right\} \quad (2)$$

In Equation 2, $\epsilon_b$ is the background permittivity, $E_F$ is the chemical potential with the temperature dependence captured by Equation 3 below:

$$E_F(T) = \frac{2^{\frac{1}{3}}\left[9E_F(0)^3 + \sqrt{81E_F(0)^6 + 12\pi^6 k_B^6 T^6}\right] - 2\pi^2 3^{\frac{1}{3}} k_B^2 T^2}{6^{\frac{2}{3}}\left[9E_F(0)^3 + \sqrt{81E_F(0)^6 + 12\pi^6 k_B^6 T^6}\right]^{\frac{1}{3}}} \quad (3)$$

where $E_F(0)$=0.163 eV is the chemical potential at T=0 K such that $E_F$=0.15 eV at T=300 K, $$\Omega_0 = \frac{\hbar\omega}{E_F}$$

is the normalized real frequency, $$\Omega = \frac{\hbar(\omega + i\tau^{-1})}{E_F}$$

is the normalized complex frequency, $\tau^{-1}$ is the Drude damping rate, $G(E)=n(-E)-n(E)$, with $n(E)$ being the Fermi distribution function, $$r_s = \frac{e^2}{4\pi\epsilon_0 \hbar v_F}$$

is the effective fine-structure constant, $v_F$ is the Fermi velocity, g is the number of Weyl nodes, and $$\eta_c = \frac{E_c}{E_F},$$

where $E_c$ is the cutoff energy beyond which the band dispersion is no longer linear. As such, for calculation and/or simulation purposes the flowing parameters are used: $\epsilon_b=6.2$, $\eta_c 3=3$, $\tau=1\times10^{-12}$ s, $g=2$, $b=2\times10^9$ m$^{-1}$, and $v_F=0.83\times10^5$ m/s.

For the example bi-functional thermal cooling system 100, the total heat flux $Q_{tot}$ from the first body 102, the second body 104, and the third body 106 may be evaluated as the summation of the heat fluxes from the first body 102 to the second body 104, $Q_{12}$, and the second body 104 to the third body 106, $Q_{13}$, respectively. The expression is given by the fluctuational electrodynamics defined by Equation 4:

$$Q_{tot}(\theta_2, \theta_3) = Q_{12}(\theta_2, \theta_3) + Q_{13}(\theta_2, \theta_3) \quad (4)$$

$$= \int_{-\infty}^{\infty} \frac{d\beta}{2\pi} |\beta| \int_0^{+\infty} \frac{d\omega}{2\pi} \int_0^{\pi} \frac{d\phi}{2\pi} [\Theta_{12}(\omega, T, \Delta T_1) \xi^{1,2}(\omega, \beta, \phi, \theta_2, \theta_3) + \Theta_{13}(\omega, T, \Delta T_1, \Delta T_3) \xi^{1,3}(\omega, \beta, \phi, \theta_2, \theta_3)]$$

where s and p represent the polarization of the incident electromagnetic wave, $\beta$ is the wave vector component that is parallel to the xy-plane, $\omega$ is the angular frequency, $\Theta_{12}(\omega, T, \Delta T_1)=\Theta_1(\omega, T-\Delta T_1)-\Theta_2(\omega, T)$ and $\Theta_{13}(\omega, T, \Delta T_1, \Delta T_2)=\Theta_1(\omega, T-\Delta T_1)-\Theta_3(\omega, T+\Delta T_3)$ represent the difference between the mean energy of Planck's oscillators for each body $$\Theta_1(\omega, T - \Delta T_1) = \hbar\omega / \left\{\exp\left[\frac{\hbar\omega}{k_B(T-\Delta T_1)}\right] - 1\right\},$$

$$\Theta_2(\omega, T) = \hbar\omega / \left\{\exp\left[\frac{\hbar\omega}{k_B T}\right] - 1\right\}, \text{ and}$$

$$\Theta_3(\omega, T + \Delta T_3) = \hbar\omega / \left\{\exp\left[\frac{\hbar\omega}{k_B(T+\Delta T_3)}\right] - 1\right\},$$

and $\xi^{1,2}(\omega, \beta, \phi, \theta_2, \theta_3)$ [$\xi^{1,3}(\omega, \beta, \phi, \theta_2, \theta_3)$] is the photon tunneling probability from the first body 102 to the second body 104 (the third body 106), the latter of which is rotated by $\theta_2$ ($\theta_3$), in the presence of the third body 106 rotated by $\theta_3$ ($\theta_2$), for the incident angle $\phi$. These probabilities may be obtained by a scattering matrix defined by Equations 5 and 6 below:

$$\xi^{1,2}(\omega,\beta,\phi,\theta_2) = Tr\{\mathbb{D}_{1,23} \mathbb{W}_{-1}(\mathbb{T}_{2\,1})\mathbb{D}_{1,23}^\dagger [\mathbb{W}_1(\mathbb{T}_{2\,32-})-\mathbb{S}_{1\,2-}\mathbb{D}_{3,2} \mathbb{W}_1(\mathbb{T}_{2\,3})\mathbb{D}_{3,2}^\dagger \mathbb{T}_{2-}^\dagger]\} \quad (5)$$

$$\xi^{1,3}(\omega,\beta,\phi,\theta_3) = Tr\{\mathbb{D}_{12,3} \mathbb{T}_{2+}\mathbb{D}_{1,2} \mathbb{W}_{-1}(\mathbb{T}_{2\,1}) \mathbb{D}_{1,2}^\dagger \mathbb{T}_{2+}^\dagger \mathbb{D}_{12,3}^\dagger \mathbb{W}_1(\mathbb{T}_{2\,3})\} \quad (6)$$

where $Tr\{\ldots\}$ denotes the matrix trace, and the auxiliary functions are defined by Equation 7 below:

$$\mathbb{W}_n(\mathbb{S}_i) = \begin{cases} \sum_{-1}^{pw} - \mathbb{S}_i \sum_{-1}^{pw} \mathbb{S}_i^\dagger + \mathbb{S}_i \sum_{-1}^{ew} - \sum_{-1}^{ew} \mathbb{S}_i^\dagger, & n = -1 \\ \sum_1^{pw} - \mathbb{S}_i^\dagger \sum_1^{pw} \mathbb{S}_i + \mathbb{S}_i^\dagger \sum_1^{ew} - \sum_1^{ew} \mathbb{S}_i, & n = 1 \end{cases} \quad (7)$$

where $\mathbb{T}_{2\,1}=e^{ik_{0z}d_{12}}\mathbb{R}_{1\,1}e^{ik_{0z}d_{12}}$, $\mathbb{T}_{2\,2\pm}=\mathbb{R}_{1\,2\pm}$, and $\mathbb{T}_{2\,3}=e^{ik_{0z}d_{23}}\mathbb{R}_{1\,3}e^{ik_{0z}d_{23}}$ are scattering operators associated to the first body 102, the second body 104, and the third body 106 based on the reflection matrices $\mathbb{R}_{1\,1}$, $\mathbb{R}_{1\,2\pm}$, and $\mathbb{R}_{1\,3}$, which correspond to the interfaces between the first body 102 and vacuum gap $d_{12}$, the first body 102 and the second body 104, the second body 104 and the second vacuum gap $d_{23}$, and the first body 102 to the third body 106.

The "+" and "−" symbols represent the directions pointing towards the positive and negative z-axis, respectively. $\mathbb{T}_{2\,12+}$ and $\mathbb{T}_{2\,23}$ are the scattering operators when treating the first and second bodies and the second and third bodies as an individual or a single body. The two reflection matrices under such treatment follow the expressions, $\mathbb{R}_{1\,12+}=\mathbb{R}_{1\,2+}+\mathbb{S}_{1\,2+}\mathbb{D}_{1,2}e^{ik_{0z}d_{12}}\mathbb{R}_{1\,1}e^{ik_{0z}d_{12}}\mathbb{D}_{1,2}^\dagger\mathbb{S}_{1\,2+}^\dagger$ and $\mathbb{R}_{1\,23-}=\mathbb{R}_{1\,2-}+\mathbb{S}_{1\,2-}\mathbb{D}_{2,3}e^{ik_{0z}d_{23}}\mathbb{R}_{1\,3}e^{ik_{0z}d_{23}}\mathbb{D}_{2,3}^\dagger\mathbb{S}_{1\,2-}^\dagger$, where $\mathbb{D}_{1,2}=(\mathbb{I}-\mathbb{T}_{2\,1}\mathbb{T}_{2\,2-})^{-1}$ and $\mathbb{D}_{2,3}=(\mathbb{I}-\mathbb{T}_{2\,2+}\mathbb{T}_{2\,3})^{-1}$ are Fabry-Pérot-type matrices. Similarly, $\mathbb{D}_{1,23}=(\mathbb{I}-\mathbb{T}_{2\,1}\mathbb{T}_{2\,23-})^{-1}$ and $\mathbb{D}_{12,3}=(\mathbb{I}-\mathbb{T}_{2\,12+}\mathbb{T}_{2\,3})^{-1}$.

Still referring to FIGS. 1-2, the reflection matrices used above in Equations 5-6, are derived from the following Equations A(1)-A(15). Maxwell's equation may be written in the compact form below, $$\partial \psi(z)/\partial z = \mathbb{K}\psi(z) \quad A(1)$$

where $\psi(z)=\mathcal{E}_x, \mathcal{E}_y, \mathcal{H}_x, \mathcal{H}_y$ contains tangential electric and magnetic fields and $\mathbb{K}$ is a 4×4 matrix based on which the eigenvalues and eigenvectors may be determined. The solution to the differential equation in Equation A(1) may be written in the following form illustrated in Equation A(2):

$$\psi(z)=\mathbb{E}e^{\Lambda z}(\mathbb{W}_-, \mathbb{W}_+)^T \quad A(2)$$

where $\mathbb{E}=(w_1, w_2, w_3, w_4)^T$ and $\Lambda$ are the eigenvector and eigenvalue matrix, respectively, and $(\mathbb{W}_-, \mathbb{W}_+)^T$ is a column vector representing the field amplitudes along the positive (+) and negative (−) z-direction.

Even though the example bi-functional thermal cooling system 100 includes the vacuum gap $d_{12}$ to separate the semi-infinite of the first body 102 and a $t_2$ thick finite plate made of Weyl semimetals of the second body 104, $\mathbb{R}_{12+}$ is derived when the first body 102, the vacuum gap $d_{12}$, and the second body 104 are treated jointly as an individual body. The fields in each region may be written by using modified Equation A(2'):

$$\psi^j(z)=\mathbb{W}^j e^{\tilde{\Lambda}^j z}(\mathbb{W}_-^j, \mathbb{W}_+^j)^T, \quad A(2')$$

where j=the first body 102, the vacuum gap $d_{12}$, the second body 104, the vacuum gap $d_{13}$, and the third body 106.

At three interfaces formed at adjacent regions, the following boundary conditions are satisfied, as defined in Equations A(3)-A(5):

second body 104/vacuum gap $d_{23}$:

$$W^{IV}\begin{pmatrix} \mathbb{E}^{IV}_- \\ \mathbb{E}^{IV}_+ \end{pmatrix} = W^{III}\begin{pmatrix} \mathbb{E}^{III}_- \\ \mathbb{E}^{III}_+ \end{pmatrix} \qquad A(3)$$

vacuum gap $d_{23}$/second body 104:

$$W^{II}\begin{pmatrix} \mathbb{E}^{II}_- \\ \mathbb{E}^{II}_+ \end{pmatrix} = W^{III}\begin{pmatrix} e^{-i\vec{\Lambda}^{III}_- t_2} & \\ & e^{-i\vec{\Lambda}^{III}_+ t_2} \end{pmatrix}\begin{pmatrix} \mathbb{E}^{III}_- \\ \mathbb{E}^{III}_+ \end{pmatrix} \qquad A(4)$$

first body 102/vacuum gap $d_{12}$:

$$W^{II}\begin{pmatrix} e^{-i\vec{k}_{0z}d_{12}} & \\ & e^{-i\vec{k}_{0z}d_{12}} \end{pmatrix}\begin{pmatrix} \mathbb{E}^{II}_- \\ \mathbb{E}^{II}_+ \end{pmatrix} = W^{I}\begin{pmatrix} \mathbb{E}^{I}_- \\ 0 \end{pmatrix} \qquad A(5)$$

where $\vec{\Lambda}_-$ and $\vec{\Lambda}_+$ are 2×2 diagonal matrices containing eigenvalues in Weyl semimetal regions (i.e., the first body 102 and the second body 104) corresponding to waves propagating along −z- and +z-axis, respectively, and $\vec{k}_{0z}$ is a 2×2 diagonal matrix having eigenvalues in vacuum regions (i.e., vacuum gap $d_{12}$ and vacuum gap $d_{23}$) associating with waves moving along +z-direction.

Rearranging of Equations A(3)-A(5) yields the following Equations A(6)-A(8):

$$\begin{pmatrix} \mathbb{E}^{III}_- \\ \mathbb{E}^{III}_+ \end{pmatrix} = [W^{III}]^{-1}W^{IV}\begin{pmatrix} \mathbb{E}^{IV}_- \\ \mathbb{E}^{IV}_+ \end{pmatrix} \qquad A(6)$$

$$\begin{pmatrix} \mathbb{E}^{II}_- \\ \mathbb{E}^{II}_+ \end{pmatrix} = [W^{II}]^{-1}W^{III}\begin{pmatrix} e^{-i\vec{\Lambda}^{III}_- t_2} & \\ & e^{-i\vec{\Lambda}^{III}_+ t_2} \end{pmatrix}[W^{III}]^{-1}W^{IV}\begin{pmatrix} \mathbb{E}^{IV}_- \\ \mathbb{E}^{IV}_+ \end{pmatrix} \qquad A(7)$$

$$\begin{pmatrix} \mathbb{E}^{II}_- \\ \mathbb{E}^{II}_+ \end{pmatrix} = \begin{pmatrix} e^{-i\vec{k}_{0z}d_{12}} & \\ & e^{-i\vec{k}_{0z}d_{12}} \end{pmatrix}[W^{II}]^{-1}W^{I}\begin{pmatrix} \mathbb{E}^{I}_- \\ 0 \end{pmatrix} \qquad A(8)$$

Substituting Equation A(8) into Equation A(7), the following relation between the fields in the first body 102 and the vacuum gap $d_{23}$ are defined by Equation A(9) below:

$$\begin{pmatrix} \mathbb{E}^{IV}_- \\ \mathbb{E}^{IV}_+ \end{pmatrix} = [W^{IV}]^{-1}W^{III}\begin{pmatrix} e^{-i\vec{\Lambda}^{III}_- t_2} & \\ & e^{-i\vec{\Lambda}^{III}_+ t_2} \end{pmatrix}[W^{III}]^{-1} \qquad A(9)$$

$$W^{II}\begin{pmatrix} e^{-i\vec{k}_{0z}d_{12}} & \\ & e^{-i\vec{k}_{0z}d_{12}} \end{pmatrix}[W^{II}]^{-1}W^{I}\begin{pmatrix} \mathbb{E}^{I}_- \\ 0 \end{pmatrix}$$

The 4×4 eigenvector matrices in Equation A(9) may be rewritten as 2×2 block matrices as defined below in Equation A(10):

$$W^{I} = \qquad W^{II} = \qquad W^{III} = \qquad W^{IV} = \qquad A(10)$$

$$\begin{pmatrix} W^{I}_{E,-} & W^{I}_{E,+} \\ W^{I}_{H,-} & W^{I}_{H,+} \end{pmatrix}, \begin{pmatrix} \vec{k}^{II}_{0z} & \vec{k}^{II}_{0z} \\ Q^{II} & -Q^{II} \end{pmatrix}, \begin{pmatrix} W^{III}_{E,-} & W^{III}_{E,+} \\ W^{III}_{H,-} & W^{III}_{H,+} \end{pmatrix}, \begin{pmatrix} \vec{k}^{IV}_{0z} & \vec{k}^{IV}_{0z} \\ Q^{IV} & Q^{IV} \end{pmatrix},$$

where I is first body 102, II is the vacuum gap $d_{12}$, III is the second body 104, and IV is the vacuum gap $d_{23}$, and where $$Q = \begin{pmatrix} 0 & -i + i\beta^2/k_0 \\ ik_0 & 0 \end{pmatrix}$$

and $k_0 = \omega/c$ is the wavevector in vacuum. For simplicity, matrix $\mathbb{M}$ is defined with Equation A(11) below:

$$\mathbb{M} = \qquad A(11)$$

$$[W^{IV}]^{-1}W^{III}\begin{pmatrix} e^{i\vec{\Lambda}^{III}_- t_2} & \\ & e^{i\vec{\Lambda}^{III}_+ t_2} \end{pmatrix}[W^{III}]^{-1}W^{II}\begin{pmatrix} e^{i\vec{k}_{0z}d_{12}} & \\ & e^{-i\vec{k}_{0z}d_{12}} \end{pmatrix}[W^{II}]^{-1}$$

such that Equation A(9) may be expressed as Equation A(12) below.

$$\begin{pmatrix} \mathbb{E}^{IV}_- \\ \mathbb{E}^{IV}_+ \end{pmatrix} = \mathbb{M}W^{I}\begin{pmatrix} \mathbb{E}^{I}_- \\ 0 \end{pmatrix} = \begin{pmatrix} \mathbb{M}_{11} & \mathbb{M}_{12} \\ \mathbb{M}_{21} & \mathbb{M}_{22} \end{pmatrix}\begin{pmatrix} W^{I}_{E,-} & W^{I}_{E,+} \\ W^{I}_{H,-} & W^{I}_{H,+} \end{pmatrix}\begin{pmatrix} \mathbb{E}^{I}_- \\ 0 \end{pmatrix} \qquad A(12)$$

Using algebraic manipulations, Equation A(13) is defined below:

$$\begin{pmatrix} \mathbb{E}^{IV}_- \\ \mathbb{E}^{IV}_+ \end{pmatrix} = \begin{bmatrix} (\mathbb{M}_{11}W^{I}_{E,-} + \mathbb{M}_{12}W^{I}_{H,-})\mathbb{E}^{I}_- \\ (\mathbb{M}_{21}W^{I}_{E,-} + \mathbb{M}_{22}W^{I}_{H,-})\mathbb{E}^{I}_- \end{bmatrix} \qquad A(13)$$

As such, the incident and reflected fields $\mathbb{E}^{IV}_-$ and $W^{IV}_+$ may be linked as defined in Equation A(14) below:

$$W^{IV}_+ = (\mathbb{M}_{21}W^{I}_{E,-}{}' + \mathbb{M}_{22}W^{I}_{H,-}{}')(\mathbb{M}_{11}W^{I}_{E,-}{}' + \mathbb{M}_{12}W^{I}_{H,-}{}')^{-1}\mathbb{E}^{IV}_- = \mathbb{R}_{12+}\mathbb{E}^{IV}_- \qquad A(14)$$

The reflection matrix $\mathbb{R}_{12+}$ may then be obtained by the Equation A(15) below:

$$\mathbb{R}_{12+} = (\mathbb{M}_{21}W^{I}_{E,-}{}' + \mathbb{M}_{22}W^{I}_{H,-}{}')(\mathbb{M}_{11}W^{I}_{E,-}{}' + \mathbb{M}_{12}W^{I}_{H,-}{}')^{-1} \qquad A(15)$$

It should be understood that other reflection (transmission) matrices in Equations (5)-(6) may be derived through following similar processes described by Equations A(1)-A(15).

Still referring to FIGS. 1-2, in Equation 7 above, the projection operators $\Sigma_{1(-1)}^{pw(ew)}$ are used to identify the propagating and evanescent modes. Denoting $\mathbb{R}_{i\alpha}(\mathbb{T}_{i\alpha})$ as the reflection (transmission) matrix at the interface between the body i and the vacuum cavity, where α indicates "+" or "−", the matrix may be determined by solving the Maxwell's equation by matching the boundary conditions at the corresponding interfaces. These matrices take the form $$\mathbb{R}_{i\alpha}\begin{pmatrix} r^{pp}_i & r^{ps}_i \\ r^{sp}_i & r^{ss}_i \end{pmatrix}$$

-continued $$\mathbb{T}_{i\alpha} = \begin{pmatrix} t_i^{pp} & t_i^{ps} \\ t_i^{sp} & t_i^{ss} \end{pmatrix},$$

where the Fresnel reflection coefficients and transmission coefficients account for s and p polarizations.

Referring back to FIG. 1 and Equation 4 above, the net heat flux flowing into the second body 104 is defined by $Q_{12}$. Similarly, the net heat flux flowing out of the second body 104 $Q_{23}$, which quantizes the net energy exchange between the second body 104 and the third body 106 may be defined. With these quantities, the temperature T of the second body 104 may be uniquely determined by enforcing the thermal equilibrium, $Q_{12}=Q_{23}$, and solving for T using an iterative process. To isolate the effect of the rotations of the second body 104 and the third body 106, it is convenient to introduce the following heat transfer coefficient $$h_{12}(\theta_2, \theta_3, T) = \lim_{\Delta T_1 \to 0} \left| \frac{Q_{12}(\theta_2, \theta_3)}{\Delta T_1} \right| \quad (8)$$

$$h_{23}(\theta_2, \theta_3, T) = \lim_{\Delta T_2 \to 0} \left| \frac{Q_{23}(\theta_2, \theta_3)}{\Delta T_2} \right| \quad (9)$$

$$h_{13}(\theta_2, \theta_3, T) = \lim_{\Delta T_1 \to 0, \Delta T_2 \to 0} \left| \frac{Q_{13}(\theta_2, \theta_3)}{\Delta T_1 + \Delta T_2} \right| \quad (10)$$

It should be understood that when assuming $\Delta T_1 \to 0$ and $\Delta T_2 \to 0$, the thermal equilibrium is automatically satisfied. As such, with the first body 102 pre-rotated and fixed at $\pi$, (i.e., $\theta_1=\pi$), but the second body 104 and the third body 106 are rotated by angles $\theta_2$, $\theta_3$, respectively, ranging from 0 to $\pi$, it, the heat transfer coefficient $h_{12}$, corresponds to the vacuum gap $d_{12}$ and the heat transfer coefficient $h_{23}$ corresponds to the vacuum gap $d_{23}$.

Figure 3B:
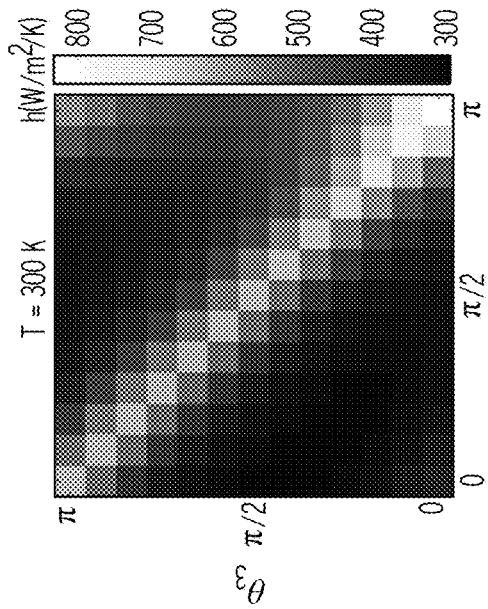
FIG. 3B schematically depicts a graphical representation of a color map of the first example bi-functional thermal cooling system of FIG. 1 illustrating a heat transfer coefficient at various rotation angles of the second body and the third body when the temperature is equal to 300 kelvin according to one or more embodiments shown and described herein.
Figure 3D:
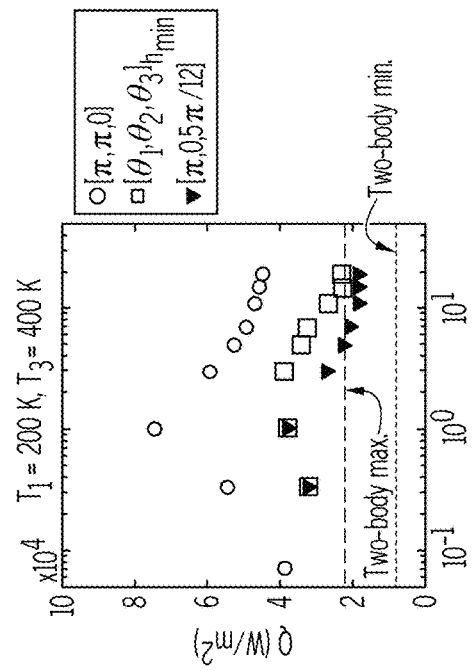
FIG. 3D schematically depicts a graphical representation of a total heat flux at three combinations of rotation angles when a ratio of cavities between bodies of the bi-functional thermal cooling system of FIG. 1 is varied according to one or more embodiments shown and described herein.
Figure 3A:
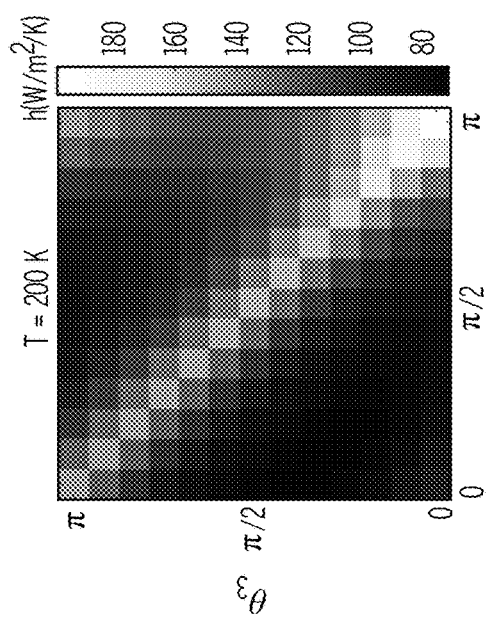
FIG. 3A schematically depicts a graphical representation of a color map of the first example hi-functional thermal cooling system of FIG. 1 illustrating a heat transfer coefficient at various rotation angles of the second body and the third body when the temperature is equal to 200 kelvin according to one or more embodiments shown and described herein.
Figure 3C:
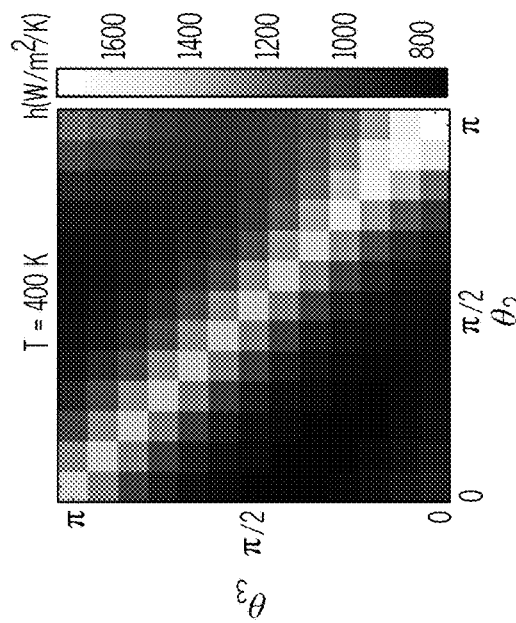
FIG. 3C schematically depicts a graphical representation of a color map of the first example bi-functional thermal cooling system of FIG. 1 illustrating a heat transfer coefficient at various rotation angles of the second body and the third body when the temperature is equal to 400 kelvin according to one or more embodiments shown and described herein.

Now referring to FIGS. 2 and 3A-3D, the total heat transfer coefficient $h=h_{12}+h_{23}$ are illustrated in the color map of FIGS. 3A-3C at different combinations of rotation angles $\theta_2$, $\theta_3$ and at different temperatures. The minimum and maximum values of h locate at positions other than the origin, which is the initial state where $\theta_2=\theta_3=0$. This demonstrates the bi-functionality of either reducing or increasing the heat transfer by the rotation, which is improvements over conventional systems where the heat transfer may only be reduced. Further, it should be appreciated that the heat transfer coefficients h as a function of rotation angles $\theta_2$ and $\theta_3$ account for cavity size asymmetries. That is, the first body 102, the second body 104, the third body 106, the vacuum gap $d_{12}$ and/or the vacuum gap $d_{23}$ may be in an asymmetric arrangement. As such, an asymmetric arrangement of the first body, the second body, and the third body increases or decreases a near-field radiative heat transfer compared to a symmetric arrangement.

Now referring to FIGS. 3A-3C, which graphically illustrate similar trends of the heat transfer coefficients h between different temperatures (e.g., 200 kelvin, 300 kelvin and 400 kelvin) in a diagonal pattern running from a top left to a bottom right of the color map and similar vertical bars at the different temperatures at the far right side of the color maps. Further, the hottest point of all three color maps is where $\theta_2=\pi$, $\theta_3=0$. As illustrated, located here is a maximum heat transfer coefficient. Therefore, the second body 104 (FIG. 1) is rotated, the third body 106 (FIG. 1) is fixed at zero angle, and the first body 102 (FIG. 1) is fixed at some angle.

Further, the minimum or smallest heat transfer coefficient is when $\theta_2=\theta_0$, $\theta_3=0$ meaning the second body 104 (FIG. 1) is fixed at angle zero, the third body 106 (FIG. 1) is fixed at zero angle, and the first body 102 (FIG. 1) is fixed at some angle. As such, using these angles, changing the vacuum gaps changes the total heat flux $Q_{tot}$ as illustrated in FIG. 3D.

Referring now to FIG. 3D, the total heat flux $Q_{tot}$ is illustrated at three combinations of rotation angles $\theta_2$ and $\theta_3$ when the ratio of the vacuum gaps $d_{23}$, $d_{12}$ is varied with the temperature of the first body 102 (FIG. 1) and the third body 106 fixed at the temperatures of 200 and 400 K and the temperature of the second body 104 determined by the conservation of energy. The graphical representation demonstrates the bi-functionality of either reducing or increasing the total heat flux at a large temperature gradient by simultaneously modulating the rotation and the cavity or vacuum gap sizes. Comparing with a $Q_{tot}$ of a conventional two-body system, the maximum $Q_{tot}$ of the bi-functional thermal cooling system 10 is significantly higher. The range of $Q_{tot}$ of the bi-functional thermal cooling system 10 also far exceeds that of the conventional two-body system, which offers improved thermal switching ratio.

Figure 4:
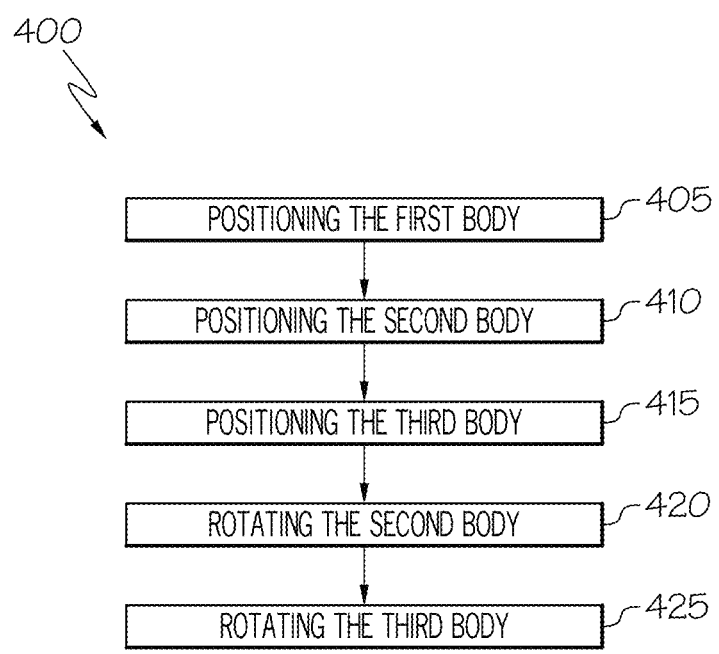
FIG. 4 schematically depicts an illustrative method of forming the bi-functional thermal cooling system of FIG. 1 according to one or more embodiments shown and described herein.

FIG. 4 is a flow diagram that graphically depicts an illustrative method 400 forming the bi-functional thermal cooling system. Although the steps associated with the blocks of FIG. 4 will be described as being separate tasks, in other embodiments, the blocks may be combined or omitted. Further, while the steps associated with the blocks of FIG. 4 will described as being performed in a particular order, in other embodiments, the steps may be performed in a different order.

At block 405, the first body is positioned. The first body may be positioned along a common axis. The first body may be formed from and/or include a plurality of Weyl semimetal nanostructures, each having an optical property used in heat transference. The first body is stationary or maintains a fixed position. At block 410, the second body is positioned to be spaced apart from the first body. The second body may be positioned a distance away from the first body that is equal to a thickness of the second body. Further, the second body may be positioned along the common axis. The second body may be formed from and/or include a second plurality of Weyl semimetal nanostructures, each having an optical property used in heat transfer. The second body is independently rotatable.

At block 415, the third body is positioned to be spaced apart from the second body. The third body may be positioned a distance away from the second body that is equal to the thickness of the second body. Further, the third body may be positioned along the common axis. The third body may be formed from and/or include a third plurality of Weyl semimetal nanostructures, each having an optical property used in heat transfer. The third body is independently rotatable.

At block 420, the second body is rotated about the common axis with a rotation angle $\theta_2$ between 0 to $\pi$ to change the optical property of each of the second plurality of Weyl semimetal nanostructures of the second body such that a mismatch in a permittivity of the optical properties of the second body and the first body is generated. The generated mismatch increases or decreases a near-field radiative heat transfer compared to a static state of the second body.

At block 425, the third body is rotated about the common axis with a rotation angle $\theta_3$ between 0 to $\pi$ to change the optical property of each of the third plurality of Weyl semimetal nanostructures of the third body such that a mismatch in a permittivity of the optical properties of the third body, second body and/or the first body is generated. The generated mismatch increases or decreases a near-field radiative heat transfer compared to a static state of the second body and/or the third body.

It should be appreciated that the illustrative method 400 may continuously be executed and continuously loop such that the example bi-functional thermal cooling system is continuous increasing or decreasing the near-field radiative heat transfer.

Figure 5:
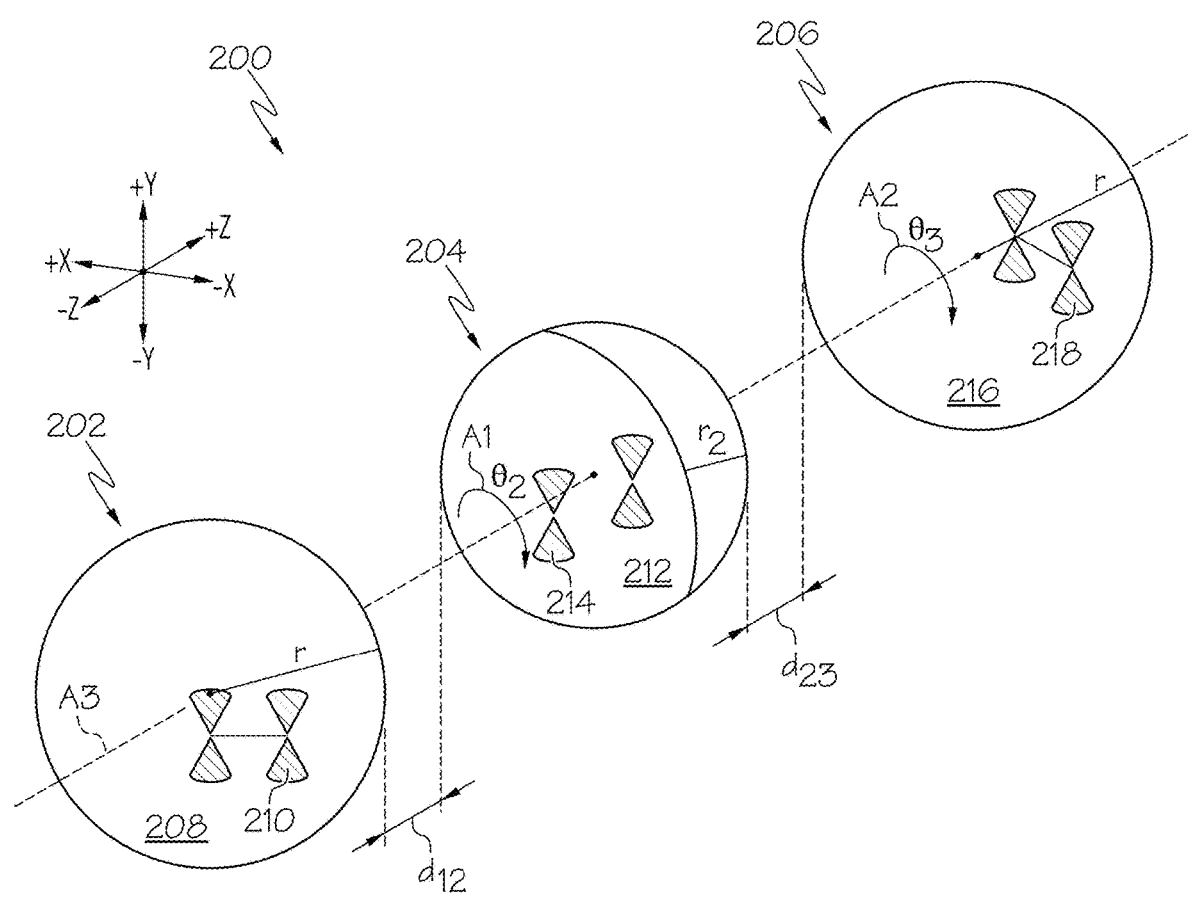
FIG. 5 schematically depicts a perspective view of a second example hi-functional thermal cooling system according to one or more embodiments shown and described herein.

Referring now to FIG. 5 a second example bi-functional thermal cooling system 200 is schematically illustrated. It is understood that the second example bi-functional thermal cooling system 200 is similar to the first example bifunctional thermal cooling system 100 with the exceptions of the features described herein. As such, like features will use the same reference numerals with a prefix "2" for the reference numbers. As such, for brevity reasons, these features will not be described again.

The second example bi-functional thermal cooling system 200 may be a three body cooling system that includes a first body 202, a second body 204 spaced apart from the first body 202, and a third body 206 spaced apart from the second body 204. The second body 204 may be positioned between the first body 202 and the third body 206. As such, the first body 202 the second body 204 and the third body 206 may be positioned in a linear arrangement along a same axis.

The first body 202 has an outer surface 208 that includes a first plurality of Weyl semimetal nanostructures 210. The first plurality of Weyl semimetal nanostructures 210 may be any shape including, for example, bicone shaped, dicone shaped, cone shaped, frustoconical shaped, cylindrical shaped, tetragonal shaped, hexagonal shaped, and/or the like.

The second body 204 has an outer surface 212 that includes a second plurality of Weyl semimetal nanostructures 214. The second plurality of Weyl semimetal nanostructures 214 may be any shape including, for example, bicone shaped, dicone shaped, cone shaped, frustoconical shaped, cylindrical shaped, tetragonal shaped, hexagonal shaped, and/or the like. The second plurality of Weyl semimetal nanostructures 214 may be the same or different from those of the first plurality of Weyl semimetal nanostructures 210.

The third body 206 has an outer surface 216 that includes a third plurality of Weyl semimetal nanostructures 218. The third plurality of Weyl semimetal nanostructures 218 may be any shape including, for example, bicone shaped, dicone shaped, cone shaped, frustoconical shaped, cylindrical shaped, tetragonal shaped, hexagonal shaped, and/or the like. The third plurality of Weyl semimetal nanostructures 218 may be the same as or different from those of the first plurality of Weyl semimetal nanostructures 210 and/or the second plurality of Weyl semimetal nanostructures 214.

In some embodiments, a radius of the first body 202 and the third body 206 are equal, as illustrated by r. The second body 204 has a radius less than that of the first body 202 and the second body 204, as illustrated by $r_2$. In other embodiments, the radius r of the first body 202 and the third body 206 may be different where either the radius r of the first body 202 is greater than the radius r of the third body 206 or the radius r of the third body 206 is greater than the radius r of the first body 202.

In some embodiments, the space between the first body 102 and the second body 104 defined by the vacuum gap $d_{12}$ and the space between the second body 104 and the third body 106 defined by the vacuum gap $d_{23}$ may be the same or equal to the radius $r_2$ of the second body 204, where $r_2 = d_{12} = d_{23}$.

Still referring to FIG. 5, in some embodiments, the second body 104 may be finite sphere made of Weyl semimetals. In some embodiments, the first body 202 and the third body 206 may each be finite spheres with the first body 202 at temperature of $T - \Delta T_1$ and the third body 206 at temperature $T + \Delta T_3$, separated by the vacuum gaps $d_{12}$ and $d_{23}$ from the second body 204, which is at the temperature of T and has a radius $r_2$. The near-field thermal radiation between two Weyl semimetal spheres may be modulated by applying a relative rotation, as discussed in greater detail herein. As such, as discussed in greater detail herein, the first body 202 is fixed and the second body 204 and the third body 206 may freely and independently rotate away from the x-axis by angles of $\theta_2$ and $\theta_3$ ranging from 0 to $\pi$ as depicted by arrows A1 and A2 in FIG. 5.

It should now be understood that the embodiments of this disclosure described herein provide a system for near-field radiative heat transfer in a three body system that utilizes rotation of a second body and/or a third body to change optical properties of a plurality of Weyl semimetal nanostructures of the second body and the third body to create a mismatch in a permittivity of the optical properties of the second body and the third body compared to the optical properties of a first body.

It is noted that the term "about" and "generally" may be utilized herein to represent the inherent degree of uncertainty that may be attributed to any quantitative comparison, value, measurement, or other representation. This term is also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A bi-functional thermal cooling system comprising:
   a first body;
   a second body having a first plurality of Weyl semimetal nanostructures, the second body spaced apart from the first body; and
   a third body having a second plurality of Weyl semimetal nanostructures, the third body spaced apart from the second body,
   wherein the second body and the third body are each configured to independently rotate with respect to the first body to change optical properties of the first plurality of Weyl semimetal nanostructures of the second body and optical properties of the second plurality of Weyl semimetal nanostructures of the third body.

2. The bi-functional thermal cooling system of claim 1, wherein the second body is positioned between the first body and the third body along a same axis.

3. The bi-functional thermal cooling system of claim 1, wherein the first body is a heat source to generate a heat.

4. The bi-functional thermal cooling system of claim 1, wherein the second body is a heat modulator that receives a heat from the first body and modulates the heat received from the first body.

5. The bi-functional thermal cooling system of claim 1, wherein the third body is a heat sink that receives a heat from the first body.

6. The bi-functional thermal cooling system of claim 1, wherein the rotation of the second body and/or the third body changes a position of the second body such that the first body, the second body, and the third body switch between a symmetric arrangement and an asymmetric arrangement.

7. The bi-functional thermal cooling system of claim 6, wherein the rotation of the second body or the third body changes the optical properties of the first plurality of Weyl semimetal nanostructures of the second body and the optical properties of the second plurality of Weyl semimetal nanostructures of the third body.

8. The bi-functional thermal cooling system of claim 7, wherein the changes in the optical properties of the first plurality of Weyl semimetal nanostructures of the second body and the second plurality of Weyl semimetal nanostructures of the third body create a mismatch in a permittivity of the optical properties of the first plurality of Weyl semimetal nanostructures and a mismatch in a permittivity of the optical properties of the second plurality of Weyl semimetal nanostructures compared to a permittivity of optical properties of the first body.

9. The bi-functional thermal cooling system of claim 8, wherein the rotation of the second body or the third body increases or decreases a near-field radiative heat transfer compared to a static state of the second body or the third body.

10. The bi-functional thermal cooling system of claim 7, wherein the rotation of the second body and the third body is between 0 degrees and 180 degrees.

11. The bi-functional thermal cooling system of claim 1, wherein an asymmetric arrangement of the first body, the second body, and the third body increases or decreases a near-field radiative heat transfer compared to a symmetric arrangement.

12. A method for forming a bi-functional thermal cooling system, the method comprising:
rotating a second body having a first plurality of Weyl semimetal nanostructures, the second body is spaced apart from a first body, wherein the rotation of the second body changes optical properties of the first plurality of Weyl semimetal nanostructures; and
independently rotating a third body having a second plurality of Weyl semimetal nanostructures, the third body is positioned spaced apart from the first body and the second body,
wherein the rotation of the third body changes optical properties of the second plurality of Weyl semimetal nanostructures.

13. The method of claim 12, wherein the second body is positioned between the first body and the third body along a same plane.

14. The method of claim 12, wherein the rotation of the second body and/or the third body changes a position of the second body such that the first body, the second body, and the third body switch between a symmetric arrangement and an asymmetric arrangement.

15. The method of claim 14, wherein the changes in the optical properties of the first plurality of Weyl semimetal nanostructures of the second body creates a mismatch in a permittivity of the optical properties of the first plurality of Weyl semimetal nanostructures compared to the a permittivity of optical properties of the first body.

16. The method of claim 15, wherein the changes in the optical properties of the second plurality of Weyl semimetal nanostructures of the third body creates a mismatch in a permittivity of the optical properties of the second plurality of Weyl semimetal nanostructures compared to the permittivity of the optical properties of the first body.

17. The method of claim 12, wherein the rotation of the second body or the third body increases or decreases a near-field radiative heat transfer compared to a static state of the second body or the third body.

18. The method of claim 12, wherein a thickness of the second body defines the space that the second body is spaced apart from the first body and the space that the third body is spaced apart from the second body.

19. A thermal cooling system comprising:
a first body configured as a heat source that generates heat;
a second body having a first plurality of Weyl semimetal nanostructures and is spaced apart from the first body, wherein the second body is a heat modulator; and
a third body having a second plurality of Weyl semimetal nanostructures, wherein the third body is spaced apart from the second body, the second body is positioned between the first body and the third body, the third body is a heat sink to receive the heat;
wherein the second body and the third body are each configured to independently rotate with respect to the first body to change optical properties of the first plurality of Weyl semimetal nanostructures of the second body and optical properties of the second plurality of Weyl semimetal nanostructures of the third body.

20. The thermal cooling system of claim 19, wherein:
the rotation of the second body or the third body changes the optical properties of the first plurality of Weyl semimetal nanostructures of the second body and the optical properties of the second plurality of Weyl semimetal nanostructures of the third body to create a mismatch in a permittivity of the optical properties of the first plurality of Weyl semimetal nanostructures and a mismatch in a permittivity of the optical properties of the second plurality of Weyl semimetal nanostructures compared to a permittivity of optical properties of the first body.

* * * * *

UNITED STATES PATENT AND TRADEMARK OFFICE
CERTIFICATE OF CORRECTION

| | | |
|---|---|---|
| PATENT NO. | : 12,339,075 B2 | Page 1 of 2 |
| APPLICATION NO. | : 17/961285 | |
| DATED | : June 24, 2025 | |
| INVENTOR(S) | : Ziqi Yu et al. | |

It is certified that error appears in the above-identified patent and that said Letters Patent is hereby corrected as shown below:

In the Specification

In Column 1, Line 35, delete "," and insert --.--, therefor.

In Column 1, Line(s) 39, delete "bifunctional" and insert --bi-functional--, therefor.

In Column 2, Line(s) 35, delete "hi-functional" and insert --bi-functional--, therefor.

In Column 2, Line(s) 65, delete "hi-functional" and insert --bi-functional--, therefor.

In Column 3, Line(s) 4, delete "hi-functional" and insert --bi-functional--, therefor.

In Column 3, Line(s) 59, after "FIG. 1)", delete "," and insert --.--, therefor.

In Column 3, Line(s) 67, delete "hi-functional" and insert --bi-functional--, therefor.

In Column 5, Line(s) 15, after "$d_{23}$", delete "," and insert --.--, therefor.

In Column 5, Line(s) 19, before "$d_{23}$", delete "(".

In Column 5, Line(s) 22, after "example", delete ";" and insert --,--, therefor.

In Column 5, Line(s) 23, delete "(nm y" and insert --(nm),--, therefor.

In Column 5, Line(s) 24, delete "die" and insert --$d_{12}$--, therefor.

In Column 5, Line(s) 26, delete "$t_2\pm$ vacuum gap $d_{12}+$ vacuum gap $d_{23}$" and insert --$t_2+$ vacuum gap $d_{12}+$ vacuum gap $d_{23}$--, therefor.

In Column 5, Line(s) 47, after "FIG. 1", delete "," and insert --.--, therefor.

Signed and Sealed this
Second Day of September, 2025

Coke Morgan Stewart
*Acting Director of the United States Patent and Trademark Office*

CERTIFICATE OF CORRECTION (continued)
U.S. Pat. No. 12,339,075 B2

In Column 6, Line(s) 21, delete "$\vec{2}$" and insert --$2\vec{b}$--, therefor.

In Column 6, Line(s) 25, delete

"$$\overline{\overline{\epsilon}}(\Phi + \theta_m) = \begin{bmatrix} \epsilon_d & 0 & -i\epsilon_a \cos(\Phi + \theta_m) \\ 0 & \epsilon_d & i\epsilon_a \sin(\Phi + \theta_m) \\ -i\epsilon_a \cos(\Phi + \theta_m) & -i\epsilon_a \sin(\Phi + \theta_m) & \epsilon_d \end{bmatrix}$$" and insert --$$\overline{\overline{\epsilon}}(\Phi + \theta_m) = \begin{bmatrix} \epsilon_d & 0 & i\epsilon_a \cos(\Phi + \theta_m) \\ 0 & \epsilon_d & i\epsilon_a \sin(\Phi + \theta_m) \\ -i\epsilon_a \cos(\Phi + \theta_m) & -i\epsilon_a \sin(\Phi + \theta_m) & \epsilon_d \end{bmatrix}$$--, therefor.

In Column 7, Line(s) 26, delete "$\eta_c3=3,$" and insert --$\eta_c = 3,$--, therefor.

In Column 8, Line(s) 49, delete "ψ(z)=$\epsilon_x$, $\epsilon_y$, H $_x$, H $_y$)" and insert --ψ(z)=$\epsilon_x$, $\epsilon_y$, H$_x$, H$_y$)--, therefor.

In Column 9, Line(s) 2, delete "$d_{13}$" and insert --$d_{23}$--, therefor.

In Column 10, Line(s) 65, delete "$R_{i\alpha}\begin{pmatrix} r_i^{pp} & r_i^{ps} \\ r_i^{sp} & r_i^{ss} \end{pmatrix}$" and insert --$R_{i\alpha} = \begin{pmatrix} r_i^{pp} & r_i^{ps} \\ r_i^{sp} & r_i^{ss} \end{pmatrix}$--, therefor.

In Column 11, Line(s) 36, delete "it" and insert --π--, therefor.

In Column 12, Line(s) 2, delete "$\theta_2=\theta 0$" and insert --$\theta_2=0$--, therefor.

In Column 13, Line(s) 13 & 14, delete "bifunctional" and insert --bi-functional--, therefor.

In Column 13, Line(s) 26, after "202", insert --,--.